UNITED STATES PATENT OFFICE.

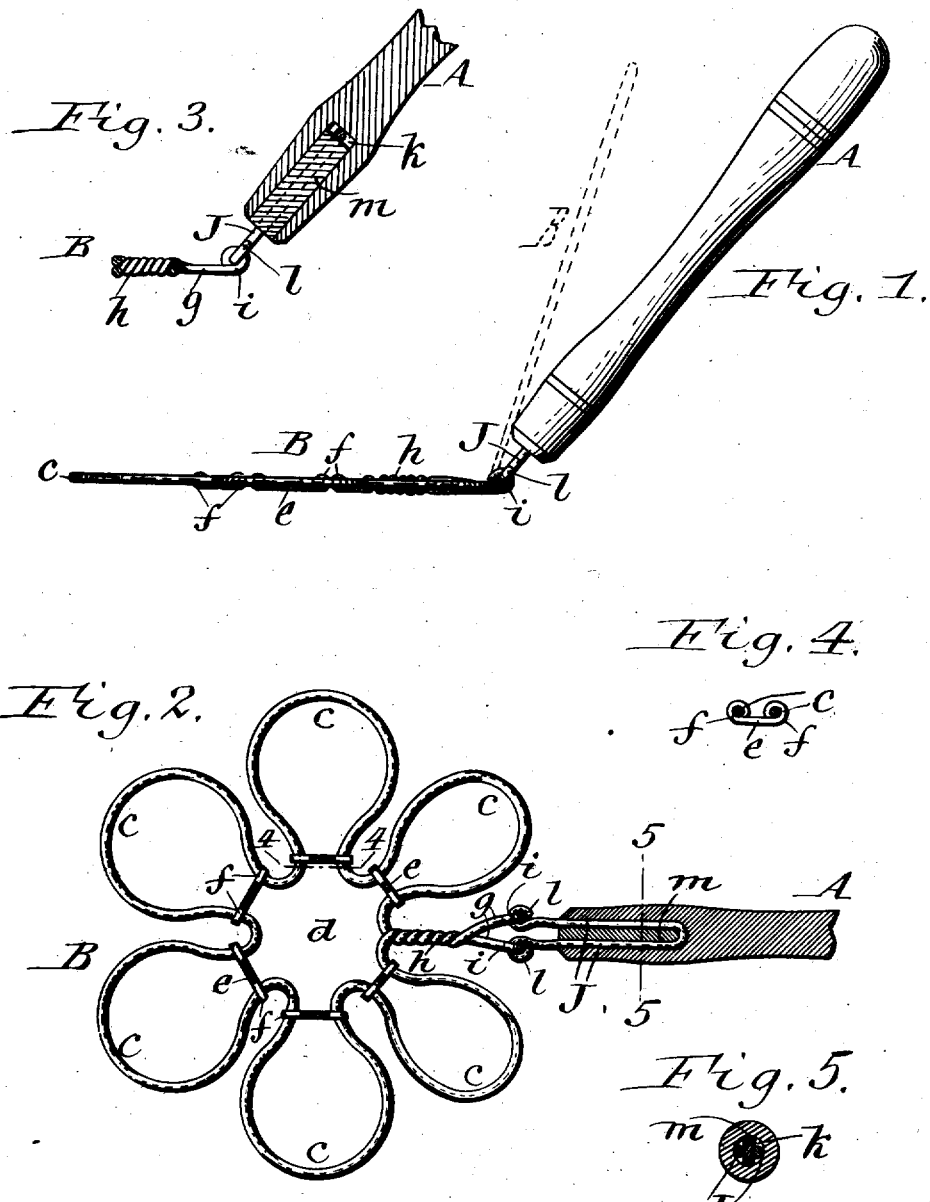

ARTHUR E. BENNETT, OF BUFFALO, AND JAMES H. HUNTER, OF WILLIAMSVILLE, NEW YORK, ASSIGNORS OF ONE-THIRD TO GERRITT W. POST, OF KENMORE, NEW YORK.

CARPET-BEATER.

973,847.     Specification of Letters Patent.     Patented Oct. 25, 1910.

Application filed February 24, 1908. Serial No. 417,511.

*To all whom it may concern:*

Be it known that we, ARTHUR E. BENNETT, a citizen of the United States, residing at Buffalo, in the county of Erie and State of New York, and JAMES H. HUNTER, a subject of the King of England, and residing at Williamsville, in the county of Erie and State of New York, have invented a new and useful Improvement in Carpet-Beaters, of which the following is a specification.

The object of this invention is the production of an inexpensive and efficient carpet beater which permits of delivering an effective blow without liability of injuring the hands and avoids the necessity of stooping unduly when beating a carpet on the ground and which can be compactly folded for shipping and storing.

In the accompanying drawings: Figure 1 is a side elevation of a carpet beater embodying our improvements. Fig. 2 is a top plan view thereof. Fig. 3 is a fragmentary vertical longitudinal section showing the hinge or pivotal connection between the head and handle. Figs. 4 and 5 are cross sections in lines 4—4 and 5—5, Fig. 2, respectively.

Similar letters of reference indicate corresponding parts throughout the several views.

The beater consists generally of a handle A and a head B pivotally connected with the handle. By thus pivotally connecting the head and handle the head can engage flatwise with the carpet while the handle inclines upwardly at an angle to the head, as shown in Fig. 1, thereby enabling an effective blow to be delivered upon the carpet without liability of injuring the hand and without necessitating undue stooping as is the case when the handle and head are rigidly connected in line with each other.

The head is of open-work or skeleton form and preferably has its main part constructed of a single piece of wire which is bent zigzag or serpentine to form a plurality of loops *c* which are arranged in an annular row or series. The bights of the several loops are at the outer ends thereof and the inner ends of the arms or branches of adjacent loops are connected while the throats or mouths at the inner ends of the several loops open into a central space *d* bounded by the loops, as shown in Fig. 2.

In order to avoid distortion of the loops of the head the branches or arms of each loop are connected by a tie or binder which preferably consists of a bar *e* extending across the throat or mouth of each loop and having eyes *f*, *f* at its opposite ends which embrace or receive the adjacent portions of the arms of the respective loop, as shown in Figs. 2 and 4.

The ends *g*, *g* of the wire of which the main part of the head is constructed are twisted together, as shown at *h* in Fig. 2.

Various means may be employed for pivotally connecting the head and handle, that shown in the drawings for example being suitable for this purpose and consisting of a pair of hinge eyes *i* formed on the extremities of the ends *g* of the head wire, a coupling shank *j* constructed of a piece of wire which is bent, folded or doubled into U-shape and seated with its bight in a longitudinal socket *k* formed in the front end of the handle, a pair of hinge eyes *l* arranged on the outer ends of the branches or arms of the coupling shank and engaging with the eyes of the head, and a filling piece, wedge or block *m* secured by driving, gluing or otherwise in the bight of the coupling shank within the socket of the handle. This manner of connecting the head and handle is very substantial and is not liable to become loose by the jerking to which the same is subjected while in use.

The two pairs of coöperating hinge eyes are arranged side by side and permit the head to move flatwise toward and from the handle but hold the head firmly against twisting or turning in any other direction relatively to the handle. By this means the movement of the head is under perfect control of the operator enabling him to always deliver an effective flatwise blow of the head against the carpet.

For the purpose of securing compactness when shipping or storing the carpet beater, the head may be folded against the handle, as shown by dotted lines in Fig. 1.

We claim as our invention:

1. A carpet beater comprising a handle, a head connected with said handle and consisting of an annular row of loops which are closed at their outer ends and each of which has a throat at its inner end, and means extending across the throat of each loop and connecting with the branches of the respective loop, substantially as set forth.

2. A carpet beater comprising a handle, and a head pivoted on said handle and consisting of an annular row of loops which are closed at their outer ends and each having a throat at its inner end, and a tie bar extending across the throat of each loop and having eyes at its opposite ends which encircle the branches of the respective loop, substantially as set forth.

3. A carpet beater comprising a handle having a socket in its front end, a shank constructed of a piece of wire which is doubled into U-shape and inserted with its bight in said socket and provided at its ends with a pair of hinge eyes, a filling piece driven into the socket between the arms of said shank, and a head constructed of a piece of wire and provided with a pair of hinge eyes which engage with the hinge eyes on the handle, substantially as set forth.

Witness our hands this 20th day of February, 1908.

ARTHUR E. BENNETT.
JAMES H. HUNTER.

Witnesses:
 THEO. L. POPP,
 ANNA HEIGIS.